3,223,639
SOLION ELECTROLYTE
Robert Allen Powers, Lakewood, Ohio, and Alvin Bayard Thomas, deceased, late of Lakewood, Ohio, by Fred L. Alexander, administrator, Berea, Ohio, assignors to Union Carbide Corporation, a corporation of New York
No Drawing. Filed July 10, 1962, Ser. No. 208,960
5 Claims. (Cl. 252—62.2)

This invention relates to a novel and improved solion electrolyte. More particularly, this invention relates to a non-aqueous electrolyte system for a solion device.

Solions are electrochemical devices extremely sensitive to low-energy stimuli. The low power requirements of a solion make it particularly useful as a circuit component in analog computers, data processing equipment, accelerometers, inertial guidance systems, rectifiers, and the like. Typical solions are described in a paper by Hurd and Lane, "Principles of Very Low Power Electrochemical Control Devices," Journal of the Electrochemical Society, vol. 104, No. 12, 1957, pp. 727–730, and in U.S. Patent 2,890,414 to E. S. Snavely, Jr., issued on June 9, 1959.

Basically a solion comprises a reversible redox system dissolved in a solvent, the resulting solution usually being referred to as an electrolyte. The electrolyte is contained in one or more compartments provided with suitable electrodes. In a typical solion two or more electrochemically connected compartments are employed. During operation electromotive force is applied across the solion and an electric current passes through the electrolyte. The ions of the reversible redox system act as charge carriers. As the current flow continues, reduction takes place at the cathode and oxidation takes place at the anode. This, in turn, produces a change in the concentration of cations and anions in the electrolyte. The degree of this change is proportional to the time of current flow and can be ascertained by visual observation, electrical measurements, photoelectric methods, titration, and the like.

Typical prior art solions employ platinum electrodes in contact with an aqueous electrolyte solution of a reversible redox system. Such devices have limited application, however, because of the relatively high freezing point of the electrolyte. Moreover, the ease of solubility of many impurities in an aqueous electrolyte often results in contamination of the system which in turn results in erroneous measurements. Also, the low decomposition potential of an aqueous electrolyte restricts the range of bias voltage that can be applied to the electrodes of the solion. Such restrictions require special and expensive battery system which must be designed specifically for the particular intended use.

Some prior art devices have attempted to employ organic solvents such as nitrobenzene and carbon tetrachloride as electrolytes. Such devices have met with limited success, however, because of reactivity of the solvent, poor conductivity, or both.

It is a primary object of the present invention to obviate the aforesaid difficulties and to provide an electrolyte system for solions that is operative at very low temperatures.

It is another object to provide an electrolyte system that possesses a relatively high decomposition potential.

It is a further object to provide a non-aqueous electrolyte system for solions which permits a relatively greater flexibility of design and application of these devices.

These and other related objects are achieved by the present invention in which a non-aqueous polar electrolyte comprises a quaternary ammonium salt dissolved therein in addition to a reversible redox system. Particularly suitable, and thus preferred, electrolytes are polar solvents such as acetonitrile, and the like, having dissolved therein a reversible redox system such as iodine-iodide, bromine-bromide, ferri-cyanide-ferrocyanide, ferric-ferrous, ceric-cerous, and the like.

By the term "quaternary ammonium salt" as used herein and in the appended claims is meant an aliphatic compound containing quinquevalent nitrogen. Typical, illustrative compounds of this type are tetra-n-butyl ammonium iodide, tetraethyl ammonium chloride, and the like.

Preferred quaternary ammonium salts useful with a non-aqueous polar electrolyte according to the present invention can be represented by the general formula

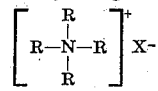

wherein R can be an alkyl radical containing from 1 to 10 carbon atoms, i.e., methyl, ethyl, propyl, isopropyl, n-butyl, sec-butyl, t-butyl, the amyls, the hexyls, the heptyls, the octyls, the nonyls and the decyls. Quaternary ammonium salts having alkyl substituents containing more than 10 carbon atoms are undesirable since they do not possess sufficient conductivity and ionize poorly. Moreover, the higher aliphatic quaternary ammonium salts are surface active agents in water and may possibly contaminate electrode surfaces even in non-aqueous media. For the purposes of the present invention the alkyl substituents of the quaternary ammonium salt preferably contain from 1 to 4 carbon atoms, i.e., the more preferred substituents are methyl, ethyl, propyl, isopropyl, n-butyl, sec-butyl, and t-butyl.

The anion $X^-$ in the above formula can be chloride, bromide, iodide, cyanide, acetate, nitrate, perchlorate, picrate, and the like. The anion can be the same as that of the chemical species of the redox system or it may be different. In the latter case the desired anion of the redox system is provided from an independent source, such as an alkali metal salt, for example.

The quaternary ammonium salt must be ionizable, soluble in the particular solvent employed, and can be present in a concentration in the range from about 0.1 M to about 1 M. A concentration in the range from about 0.1 M to about 0.5 M is preferred. The exact concentration of the quaternary ammonium salt present in the electrolyte is dependent largely on its solubility in the solvent at operating temperatures and also on the amount of current that is to be carried by the solion. In order for the solion to respond reproducibly in transporting a chemical species of the redox system from one compartment to another, the current through the electrolyte must be carried largely by the ions of the added quaternary ammonium salt. In all instances sufficient ions must be present in the electrolyte to impart a plateau, or a voltage-independent region, to the current-bias voltage characteristic curve of the particular solion.

For the purpose of the present invention the solvent must be a non-aqueous, polar liquid having a viscosity substantially that of water or lower. Furthermore, the solvent must be non-reactive with the chemical species of the redox system employed and should not undergo electrochemical oxidation or reduction during use. Preferably the solvent should be sufficiently polar to possess a dielectric constant of at least about 10. The greater the dielectric constant the more desirable the solvent, provided all other necessary characteristics are present.

In addition to the above general considerations the choice of the particular solvent employed is also governed by the ultimate environment in which the solion will be used. For example, at elevated temperatures a solvent having a relatively low vapor pressure is preferably employed whereas for low-temperature applications the viscosity and the freezing point of the liquid become important in view of the decreased mobility of ions at such temperatures.

A further consideration is the decomposition potential of the solvent employed. The particular solvent is chosen so that its decomposition potential is higher than the maximum bias voltage contemplated for the particular application. In the interests of lending a greater flexibility to the solions employing the electrolytes of the instant invention and also in order to permit a greater design flexibility, solvents having a decomposition potential greater than that of water, i.e., greater than about 1.3 volts, are preferred.

Representative non-aqueous solvents suitable in the practice of the present invention are pyridine, acetone, ethanol, methanol, N,N-dimethyl formamide, N-methyl formamide, formamide, acetonitrile, 1,2-dichloroethane, 1,1-dichloroethane and the like. Particularly preferred as a solvent lending great operational flexibility to solions is acetonitrile.

Typical electrolytes suitable for the practice of the present invention and their physical properties are compiled in Table I below.

TABLE I

*Electrolytes for solions*

| Solvent | Dielectric Constant | Viscosity (centipoise) | Melting Point (° C.) | Boiling Point (° C.) | Quaternary Ammonium Salt | Molar Conductance at Infinite Dilution (mho-cm.$^2$-mol.$^{-1}$) |
|---|---|---|---|---|---|---|
| 1,1-dichloroethane | 10.0 | 0.465 | −97.4 | 57.3 | Tetraethyl ammonium picrate | 116.6 |
| 1,2-dichloroethane | 10.23 | 0.783 | −35.3 | 83.5 | Tetra-n-butyl ammonium perchlorate | 65.40 |
| Pyridine | 12.01 | 0.882 | −41.5 | 115.5 | Tetra-n-butyl ammonium picrate | 57.7 |
| Acetone | 20.47 | 0.304 | −94.8 | 56.2 | Tetra-n-butyl ammonium nitrate | 187.2 |
| Ethanol | 24.2 | 1.09 | −114.5 | 78.4 | Tetraethyl ammonium picrate | 54.15 |
| Methanol | 32.6 | 0.545 | −97.8 | 64.7 | ----do---- | 108.0 |
| Acetonitrile | 36.2 | 0.344 | −44.9 | 81.7 | Tetra-n-amyl ammonium picrate | 135.2 |
| N-methyl formamide | 182.4 | 1.65 | −3.8 |  | Tetraethyl ammonium picrate | 39.28 |

The concentration of the chemical species that make up the reversible redox system in the electrolyte is not critical. These concentrations can be altered depending on the intended use of the solion. In general, the higher the concentration, the more sensitive the solion. Typical concentrations for iodine are in the range from about 0.025 M to about 0.5 M. Concentrations in the range from about 0.025 M to about 0.2 M are preferred.

The electrical characteristics, i.e., polarization data, were determined for a series of electrolytes containing an iodine-iodide redox system and tetra-n-butyl ammonium iodide dissolved in acetonitrile. The concentrations of iodine and tetra-n-butyl amminum iodide in these acetonitrile solutions were as follows:

|  | Conc'n of $I_2$ | Conc'n of Tetra-n-Butyl Ammonium Iodide |
|---|---|---|
| Solution A | 0.025M | 0.5M |
| Solution B | 0.025M | 1.0M |
| Solution C | 0.05M | 0.5M |
| Solution D | 0.05M | 1.0M |

Each one of the above solutions exhibited a much larger voltage-independent region in the current-bias voltage characteristic curve than was heretofore possible to achieve with aqueous systems. In addition, the decomposition potential of the above solutions was observed to be about 2.6 volts. Furthermore, the freezing point of the electrolyte was about −40° C.

The foregoing examples are intended for illustrative purposes only. Other embodiments within the spirit and scope of the present invention will readily present themselves to one skilled in the art.

We claim:

1. An electrolyte for a solion which consists essentially of a non-reactive, non-aqueous polar solvent having a viscosity not execeding that of water and having a dielectric constant of at least about 10; a reversible redox system which is a member of the group consisting of iodine-iodide, bromine-bromide, ferricyanide-ferrocyanide, ferric-ferrous, and ceric-cerous, dissolved in said solvent; and an ionizable quaternary ammonium salt, which is represented by the formula

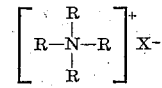

wherein R is an alkyl radical containing from 1 to 10 carbon atoms and X− is an anion selected from the group consisting of chloride, bromide, iodide, cyanide, acetate, nitrate, perchlorate, and picrate, dissolved in said solvent; said quaternary ammonium salt being present in the electrolyte in a concentration in the range from about 0.1 M to about 1 M.

2. An electrolyte for a solion which consists essentially of a non-reactive, non-aqueous polar solvent selected from the group consisting of acetonitrile, formamide, N,N-dimethyl formamide, N-methyl formamide, 1,1-dichloroethane, 1,2-dichloroethane, pyridine, acetone, ethanol, and methanol; a reversible redox system which is a member of the group consisting of iodine-iodide, bromine-bromide, ferricyanide-ferrocyanide, ferric-ferrous, and ceric-cerous, dissolved in said solvent; and an ionizable quaternary ammonium salt, represented by the formula

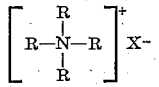

wherein R is an alkyl radical containing from 1 to 10 carbon atoms and X− is an anion selected from the group consisting of chloride, bromide, iodide, cyanide, acetate, nitrate, perchlorate, and picrate, dissolved in said solvent; said quaternary ammonium salt being present in the electrolyte in a concentration in the range from about 0.1 M to about 1 M.

3. An electrolyte for a solion which consists essentially of a solution in acetonitrile of an iodine-iodide redox system and tetra-n-butyl ammonium iodide, the tetra-n-butyl ammonium iodide being present in the solution in a concentration from about 0.1 M to about 1 M.

4. An electrolyte for a solion which consists essentially of a solution in acetonitrile of a ferrous-ferric redox system and tetra-n-butyl ammonium cyanide, the tetra-n-butyl ammonium cyanide being present in the solution in a concentration from about 0.1 M to about 1 M.

5. An electrolyte for a solion which consists essentially of a solution in acetonitrile of a cerous-ceric redox system and tetra-n-butyl ammonium chloride, the tetra-n-butyl ammonium chloride being present in the solution in a concentration from about 0.1 M to about 1 M.

References Cited by the Examiner

Hurd et al.: Principles, etc., J. of Electrochem. Soc., vol. 104, No. 12, 1957, pp. 727–730.

The Merck Index, 7th ed., 1960, p. 1022 and p. VIII.

TOBIAS E. LEVOW, *Primary Examiner.*

MAURICE A. BRINDISI, *Examiner.*